United States Patent [19]

Ochiai et al.

[11] Patent Number: 4,485,214

[45] Date of Patent: Nov. 27, 1984

[54] HIGH IMPACT POLYAMIDE COMPOSITION

[75] Inventors: Kenji Ochiai, Fujisawa; Tomiyasu Sakurai, Yokohama, both of Japan

[73] Assignee: Asahi Kasei Kogyo Kabushiki Kaisha, Osaka, Japan

[21] Appl. No.: 400,066

[22] Filed: Jul. 20, 1982

[30] Foreign Application Priority Data

Aug. 4, 1981 [JP] Japan .................. 56-121357

[51] Int. Cl.³ .......................................... C08F 8/30
[52] U.S. Cl. ................................................ 525/179
[58] Field of Search ........................................ 525/179

[56] References Cited

U.S. PATENT DOCUMENTS

| | | | |
|---|---|---|---|
| 3,373,223 | 3/1968 | Armstrong | 525/179 |
| 3,373,224 | 3/1968 | Mesrobian | 525/179 |
| 3,845,163 | 10/1974 | Murch | 260/857 |
| 4,018,733 | 4/1977 | Lopez | 525/179 |
| 4,035,436 | 7/1977 | Matsubong | 525/179 |
| 4,078,014 | 5/1978 | Starkweather | 525/179 |
| 4,174,358 | 11/1979 | Epstein | 525/183 |
| 4,404,325 | 9/1983 | Mason | 525/179 |

FOREIGN PATENT DOCUMENTS

| | | | |
|---|---|---|---|
| 2654346 | 6/1978 | Fed. Rep. of Germany . | |
| 54-4743 | 3/1979 | Japan . | |
| 55-80450 | 6/1980 | Japan . | |
| 56-167740 | 12/1981 | Japan | 525/179 |

*Primary Examiner*—Melvyn I. Marquis
*Attorney, Agent, or Firm*—Armstrong, Nikaido, Marmelstein & Kubovcik

[57] ABSTRACT

A high impact polyamide composition comprising in specific weight proportions a polyamide, an ethylene ionomer resin and an elastomeric ethylene copolymer, said ethylene ionomer resin and said elastomeric ethylene copolymer having specific relationships with respect to melt index, which exhibits excellent impact strengths at not only ordinary temperatures but also low temperatures along with remarkable improvements in other physical properties such as heat resistance, while maintaining good processability, inclusive of good moldability.

10 Claims, 1 Drawing Figure

FIGURE
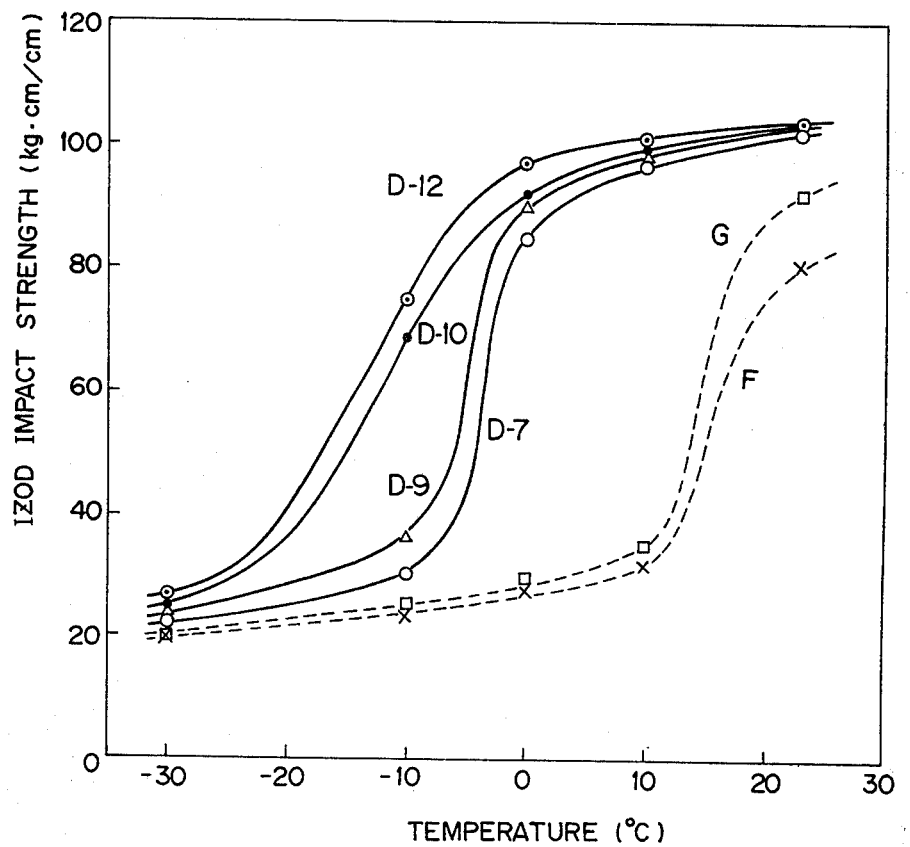

HIGH IMPACT POLYAMIDE COMPOSITION

This invention relates to a high impact polyamide composition. More particularly, the present invention is concerned with a high impact polyamide composition having an improved moldability which comprises a polyamide, an ethylene ionomer resin and an elastomeric ethylene copolymer.

It is generally known that polyamides are excellent in wear resistance, heat resistance, oil or solvent resistance and electric insulation properties as compared with other organic polymer materials. The heat resistance, stiffness and mechanical properties of polyamides are further improved by incorporating therein an inorganic material, such as glass fiber. Therefore, especially, polyamides reinforced with glass fiber are widely used to fabricate electrical parts, mechanical parts, automobile parts and other various parts. However, polyamides, in general, have fatal drawbacks, namely poor impact strength and poor dimensional stability especially in the dry state. To cope with these drawbacks, polyamides are usually subjected to a wetting treatment in which polyamides are immersed in boiling water for several hours. The wetting treatment is however burdensome and, in addition, is only effective to improve the impact strength and dimensional stability of the polyamide to a very limited extent.

Heretofore, various researches have been made to develop, produce and use polyamides or polyamide compositions having an improved impact strength. For example, there was disclosed in U.S. Pat. No. 3,845,163 blending of a polyamide and a copolymer of an alpha-olefin and an alpha, beta-ethylenically unsaturated carboxylic acid, at least 10% of the acid groups in the copolymer being neutralized with metal ions, to primarily improve the weld-line toughness of the molded product. The blend disclosed in the patent is still insufficient in impact strength, especially at low temperatures, and the composition disadvantageously has a low fluidity in a molten state.

There was disclosed in U.S. Pat. No. 4,174,358 a composition comprising polyamide and a polymer of low tensile modulus having sites which adhere to the polyamide matrix, which composition has an improved ductibility and toughness. This composition, however, has disadvantageously to be prepared by melt kneading the components with high shear strength using a special multi-screw extruder so that the modified polymer may be dispersed in the polyamide in the form of particles having a size of 1.0 μm or less. Therefore, the composition cannot be made of avail without a special extruder. In addition, when a polymer, for example, modified with maleic anhydride, is incorporated in the polyamide matrix, the moldability of the composition is lowered.

There was further disclosed in Japanese Patent Application Publication No. 54-4743/1979 a composition comprising a polyamide and an ethylene ionomer, which has an improved impact strength and processability such as moldability. This composition is distinctively improved in impact strength at ordinary temperatures and fluidity in a molten state over the prior compositions, but it is still insufficient in impact strength at low temperatures.

With a view to developing a polyamide composition having a high impact strength at not only ordinary temperatures but also low temperatures together with an improved processability such as moldability, the present inventors have made extensive and intensive studies. As a result, it has been found that the above-mentioned purpose can be attained by a composition comprising in the specific weight proportions a polyamide, an ethylene ionomer resin and an elastomeric ethylene copolymer, said ethylene ionomer resin and elastomeric ethylene copolymer having specific relationships with respect to melt index. Based on this novel finding, we have completed this invention.

It is, therefore, an object of the present invention to provide a polyamide composition having a high impact strength at ordinary to low temperatures as well as an improved processability, inclusive of improved moldability.

The foregoing and other objects, features and advantages of the present invention will be apparent to those skilled in the art from the following detailed description and appended claims taken in connection with the accompanying drawing in which FIGURE shows the impact strengths of polyamide compositions of the present invention at varied temperatures, in comparison with those of comparative compositions, which will be explained later with respect to Example 1.

According to the present invention, there is provided a high impact polyamide composition comprising a polyamide(A), an ethylene ionomer resin(B) and an elastomeric ethylene copolymer(C);

the weight proportion of the polyamide(A) relative to the total of (A), (B) and (C) being 60 to 90%, the weight proportion of the ethylene ionomer resin(B) relative to the total of (A), (B) and (C) being 1 to 45%, and the weight proportion of the elastomeric ethylene copolymer(C) relative to the total of (A), (B) and (C) being 0.5 to 40%;

and wherein the ethylene ionomer resin(B) and the elastomeric ethylene copolymer(C) respectively have melt indexes ($F_b$) and ($F_c$) satisfying the inequalities:

$$3 \geq F_b \geq 0.2$$

$$10 \geq F_c \geq 1$$

$$50 \geq F_c/F_b \geq 2$$

said melt indexes $F_b$ and $F_c$ each being given in terms of a value (g/10 min) as measured at a cylinder temperature of 190° C. with a load of 2160 g in accordance with ASTM-D 1238.

The polyamide to be employed as the component (A) of the high impact polyamide composition of the present invention is a linear synthetic polymer having the acid amide bond of —CONH— and having a number average molecular weight of about 5,000 to about 50,000. The number average molecular weight of the polyamide is measured according to the end-group determination method which will be explained later with respect to Examples. As specific examples of the suitable polyamide, there may be mentioned, for example, nylon-6, nylon-66, nylon-610, nylon-3, nylon-4, nylon-612, nylon-11 and nylon-12, which are crystalline polyamides. Of them, nylon-6 and nylon-66 are more preferable because they are superior in stiffness and heat resistance.

The ethylene ionomer resin to be employed as the component (B) of the high impact polyamide composition of the present invention is a polymer comprising ethylene monomer units, ethylenically unsaturated carboxylic acid ester monomer units, ethylenically unsaturated carboxylic acid monomer units obtained by saponification of said ester and ethylenically unsaturated carboxylic acid metal salt monomer units obtained by neutralization of said acid. The saponification of the ester to the acid may be run to the last, thereby giving an ethylene ionomer resin comprising ethylene monomer units, ethylenically unsaturated carboxylic acid monomer units and ethylenically unsaturated carboxylic acid metal salt monomer units.

The ester to be employed as a starting material of the ethylene ionomer resin is preferably an alkyl ester of an ethylenically unsaturated carboxylic acid containing 3 to 8 carbon atoms, such as acrylic acid, methacrylic acid and ethacrylic acid. As specific examples of the suitable ester to be employed, there may be mentioned, for example, methyl acrylate, ethyl acrylate, n-butyl acrylate, tert-butyl acrylate, isobutyl acrylate, methyl methacrylate, ethyl methacrylate, n-propyl methacrylate, isopropyl methacrylate, n-butyl methacrylate, tert-butyl methacrylate and isobutyl methacrylate. Of them, methyl acrylate, ethyl acrylate methyl methacrylate and n-butyl methacrylate are more preferable. As mentioned above, the monomer units of ethylenically unsaturated carboxylic acid constituting part of the ethylene ionomer resin are obtained by saponifying the ester monomer units contained in the first prepared copolymer of ethylene and an ester of ethylenically unsaturated carboxylic acid, and the metal salt monomer units of ethylenically unsaturated carboxylic acid also constituting part of the ethylene ionomer resin are obtained by neutralizing with metal ions part of the resulting carboxylic acid. As the suitable metal to be incorporated in the metal salt monomer units of ethylenically unsaturated carboxylic acid, there may be mentioned, for example, metals of Groups IA, IB, IIA, IIB, IIIA and the fourth period in Group VIII of the periodic table, such as Na, K, Cu, Mg, Ca, Ba, Zn, Cd, Al, Fe, Co and Ni. Of them, Mg and Zn are more preferable from the viewpoint of an improvement in impact strength of the resulting polyamide composition product. It is preferred that the molar proportion of the ethylene monomer units relative to the total of the ethylene monomer units, ethyleneically unsaturated carboxylic acid ester monomer units, ethylenically unsaturated carboxylic acid monomer units obtained by saponification of said ester and ethylenically unsaturated carboxylic acid metal salt monomer units obtained by neutralization of said acid be 90 to 97%, more preferably 91 to 96%. It is disadvantageously very difficult to produce a copolymer of ethylene and an ester of ethylenically unsaturated carboxylic acid, which results in a molar proportion as defined above of less than 90%, using a conventional device for preparing high-pressure polyethylene. Further, such a copolymer having a low content of ethylene monomer units is so soft that it cannot be cut for processing. If the above-defined molar ratio exceeds 97%, the improvement in impact strength is insufficient.

With respect to the other components of the ethylene ionomer resin, it is preferred that the number of moles of ethylenically unsaturated carboxylic acid ester monomer units ($\alpha$), the number of moles of ethylenically unsaturated carboxylic acid monomer units ($\beta$) and the number of moles of ethylenically unsaturated carboxylic acid metal salt monomer units ($\gamma$) satisfy the inequalities:

$$0 \leq \frac{\alpha}{\alpha + \beta + \gamma} \leq 0.6$$

$$0.1 \leq \frac{\gamma}{\alpha + \beta + \gamma} \leq 0.7,$$

more preferably $$0.1 \leq \frac{\alpha}{\alpha + \beta + \gamma} \leq 0.5$$

$$0.2 \leq \frac{\alpha}{\alpha + \beta + \gamma} \leq 0.6.$$

In general, the more the content of ester monomer units in the ionomer resin, the greater the improvement in impact strength of the polyamide composition. However, if the content of ester monomer units is too large, specifically, if the value of $\alpha/(\alpha+\beta+\gamma)$ as defined above is more than 0.6, physical properties, such as stiffness and tensile strength, of the polyamide composition are markedly lowered. With respect to the proportion of the metal salt monomer units of ethylenically unsaturated carboxylic acid, if the value of $\gamma/(\alpha+\beta+\gamma)$ as defined above is less than 0.1, the improvement in impact strength of the polyamide composition is insufficient. On the other hand, if the value of $\gamma/(\alpha+\beta+\gamma)$ is more than 0.7, fluidity of the ethylene ionomer resin in its molten state is disadvantageously lowered. The monomer units of ethylenically unsaturated carboxylic acid are required to be present in the ionomer resin because they increase the affinity between the ionomer resin and the polyamide in the polyamide composition of the present invention. However, the content of ethylenically unsaturated carboxylic acid monomer units should not be too large in order to avoid any unfavorable excessive interaction between the inonomer resin and the polyamide.

The content of each component, i.e. ethylene monomer units, ester monomer units, carboxylic acid monomer units or metal salt monomer units, in an ionomer resin may be analytically determined according to the customary method employing an infrared spectrophotometer, which will be explained later with respect to Examples.

The elastomeric ethylene copolymer to be employed as the component (C) of the high impact polyamide composition of the present invention is preferably a copolymer of ethylene and an alpha-olefin containing 3 to 8 carbon atoms. The elastomeric ethylene copolymer to be employed may be sufficiently in an unmodified form.

As specific examples of the suitable ethylene copolymer, there may be mentioned, for example, poly(ethylene-co-propylene), poly(ethylene-co-butene-1), poly(ethylene-co-hexene-1), poly(ethylene-co-4-methylbutene-1) and poly(ethylene-co-4-methylpentene-1). They may be used either alone or in mixture. Of them, poly(ethylene-co-propylene) and poly(ethylene-co-butene-1) are more preferable. In place of the above copolymer of ethylene and an alpha-olefin, there may be employed a terpolymer of ethylene, an alpha-olefin and a diene monomer. As the suitable diene monomer, there may be mentioned, for example, methylene-norbornene, ethylidene-norbornene, 1,4-hexadiene and dicyclopentadiene. The molar proportion of each component in the above-defined copolymer or terpolymer is not critical. However, it is preferred that the content of alpha-olefin monomer units in the copolymer or terpolymer be 10 to 40% by mole, more preferably 15 to 35% by mole, because the glass transition temperature and degree of crystallinity of the copolymer or terpolymer must be low to ensure a substantial improvement of the impact strength at low temperatures of the polyamide composition of the present invention.

In an essential aspect of the present invention, the high impact polyamide composition consists essentially of a polyamide (A), an ethylene inomer resin (B), and an elastomeric ethylene copolymer (C); the weight proportion of the polyamide(A) relative to the total of (A), (B) and (C) being 50 to 95%, more preferably 60 to 90%, the weight proportion of the ethylene ionomer resin(B) relative to the total of (A), (B) and (C) being 1 to 45%, more preferably 2 to 35%, and the weight proportion of the elastomeric ethylene copolymer(C) relative to the total of (A), (B) and (C) being 0.5 to 40%, more preferably 1 to 30%. If the weight proportion of an ethylene ionomer resin(B) as defined above is less than 1%, the impact strength improvement of the polyamide composition is insufficient. If it is more than 45%, the tensile strength and heat resistance of the polyamide composition are markedly lowered. Meanwhile, if the weight proportion of an elastomeric ethylene copolymer(C) as defined above is less than 0.5%, the effect as a dispersant of the copolymer is descreased so that a sufficient improvement in impact strength of the polyamide composition cannot be attained. If it is more than 40%, the tensile strength and heat resistance of the polyamide composition are unfavorably lowered as in the case of the ionomer resin.

It has been found by the present inventors through their extensive and intensive researches that the melt indexes of an ethylene ionomer resin(B) and an elastomeric ethylene copolymer(C) to be incorporated in the composition of the present invention are surprisingly very important factors to improve the impact strength of the polyamide composition while ensuring good moldability thereof, and that the purposes of the present invention are effectively attained when the ethylene ionomer resin(B) and the elastomeric ethylene copolymer(C) respectively have melt indexes ($F_b$) and ($F_c$) satisfying the inequalities:

$3 \geq F_b \geq 0.2$ $10 \geq F_c \geq 1$ $50 \geq F_c/F_b \geq 2$ said melt indexes $F_b$ and $F_c$ each being given in terms of a value (g/10 min) as measured at a cylinder temperature of 190° C. with a load of 2160 g in accordance with ASTM-D 1238.

If the above-defined $F_b$ is more than 3, the impact strength improvement of the polyamide composition is not sufficient. If it is less than 0.2, the moldability of the polyamide composition becomes so poor that the commercial-scale molding operation of the composition is caused to be difficult. Meanwhile, if the above-defined $F_c$ is more than 10, it becomes difficult to pelletize the elastomeric ethylene copolymer on a commercial scale while maintaining the features of a low crystalline elastomer. If it is less than 1, the dispersibility of the components and the moldability of the polyamide composition becomes so poor that the expected improvement of the physical properties of the polyamide composition cannot be attained. Further, if the melt index ratio of $F_c/F_b$ is not in the above-defined range, an appropriate balance of fluidity in the molten state among the component polymers of the composition of the present invention is lost to that their dispersion in the composition is adversely affected, thereby causing the improvement in impact strength of the polyamide composition to be insufficient.

In the polyamide composition of the present invention as defined above, most of the ethylene ionomer resin and elastomeric ethylene copolymer is uniformly dispersed in the polyamide matrix in the form of fine particles having an average size of about 0.1 $\mu$m to about 2.0 $\mu$m (just like an islands-in-sea structure). The polyamide composition of the present invention exhibits remarkably improved impact strengths at low temperatures while maintaining excellent moldability.

It is generally known that the impact strength of polyamides is substantially improved by compounding therewith an ethylene ionomer resin. The reason is believed to be that the highly tough ionomer resin crosslinked with metal ions is dispersed in the polyamide matrix in the form of fine particles by melt kneading the polyamide and ionomer resin in the extruder or the like, and that strong bonds are formed between the ionomer particles and the polyamide matrix by the reactions of the amine and carboxylic acid end groups of the polyamide with the pendant carboxyl acid and alkyl carboxylate groups of the ionomer resin. The impact strength of such a polyamide composition is really very good at room temperature, but it is very low at low temperatures. The Izod impact strength (notched) of such a polyamide composition in the absolutely dry state at about 0° C. or lower temperatures is occasionally only half or less of that at room temperature. To diminish the degree of decrease in impact strength, the content of the ionomer resin in the polyamide composition may be increased. However, this disadvantageously brings about lowering of the stiffness and heat resistance of the polyamide composition.

Through intensive researches, we have found that a composition comprising in the specific weight proportions a polyamide, an ethylene ionomer and an elastomeric ethylene copolymer, said ethylene ionomer and said elastomeric copolymer having specific relationships with respect to melt index surprisingly exhibits excellent impact strengths at not only ordinary temperatures but also low temperatures along with other physical properties, such as heat resistance, while maintaining good processability, such as good moldability.

The reasons why these favorable effects can be attained by incorporating such an elastomeric ethylene copolymer as has no reactive groups has not yet been elucidated. However, possible reasons are believed to be as follows. First, an elastomeric ethylene copolymer having a high fluidity in a molten state serves as a dispersant and thereby enables the polyamide and ionomer resin to be effectively melt kneaded with an extruder or the like to form a uniform composition. At the same time, it contributes to facilitating reactions of the amine and carboxylic acid end groups of the polyamide with the pendant carboxylic acid and alkyl carboxylate groups of the ionomer resin. Secondly, an elastomeric ethylene copolymer is present along the interface of the ionomer resin particles and the polyamide matrix, whereby the excellent flexibility at low temperatures of the elastomeric ethylene copolymer serves to absorb any impact imposed, thereby leading to an improved impact resistance at low temperatures of the polyamide composition. Thirdly, an elastomeric ethylene copolymer which is amorphous or low crystalline is present over the surface and within the inside of the ionomer particles and along the interface of the polyamide matrix and the ionomer resin particles, whereby the elastomeric copolymer fills any void formed due to a volume shrinkage caused by an advance of the crystallinity of the ionomer resin which is attributable to a thermal hysteresis, thereby preventing a peeling-off phenomenon at the interface.

The elastomeric ethylene copolymer to be employed as the component(C) of the high impact polyamide composition of the present invention has an excellent fluidity in a molten state and serves as a dispersant as mentioned above. Further, it has an excellent flexibility at low temperatures and is an amorphous or low crystalline polymer. However, a composition of a polyamide and an elastomeric ethylene copolymer without an ethylene ionomer resin does not exhibit an improved impact strength. From the viewpoints of improvements in impact strength and stiffness, an ethylene ionomer resin and an elastomeric ethylene copolymer may be advantageously incorporated in the polyamide composition of the present invention at a weight ratio of 9:1 to 1:4.

An inorganic material such as glass fiber, asbestos, bentonite, diatomaceous earth, mica, talc, calcium carbonate, calcium sulfate and calcium sulfite and the like or mixtures thereof may be incorporated in the composition of the present invention to improve the heat resistance and mechanical properties thereof and the dimensional stability of the shaped articles therefrom. The inorganic material-containing composition may be prepared by mixing 60 to 95 parts by weight, more preferably 65 to 90 parts by weight, of a composition consisting essentially of a polyamide, an ethylene ionomer resin and an elastomeric ethylene copolymer as defined above with 5 to 40 parts by weight, more preferably 10 to 35 parts by weight, of an inorganic material, the total weight of the polyamide composition and the inorganic material being 100 parts by weight. If the incorporated amount of the inorganic material is less than 5 parts by weight, its contribution to improvements of the heat resistance, mechanical properties and dimensional stability of the composition is insufficient. If the incorporated amount of the inorganic material is more than 40 parts by weight, both moldability and impact strength of the composition markedly decrease, and the surface appearance of the shaped articles therefrom is impaired.

It is preferred that the polyamide composition of the present invention be uniformly melt kneaded prior to molding for obtaining shaped articles. The means for melt kneading is not critical if the uniform dispersion of the ionomer resin and elastomeric copolymer in the polyamide matrix as mentioned above can be attained. However, the composition of the present invention is usually prepared by a melt kneading method using a conventional single or twin screw extruder. Normally, a twin screw extruder is more preferable.

The polyamide composition of the present invention may be prepared by first melt kneading an ionomer resin and an elastomeric copolymer to form a preliminary composition, second pelletizing the preliminary composition and third melt kneading the resulting pelletized preliminary composition with a polyamide. Alternatively, it may be prepared by simultaneously melt kneading a polyamide, an ionomer resin and an elastomeric copolymer.

It is also preferred that with respect to preparation of the inorganic material-reinforced polyamide composition of the present invention, the inorganic material and the polyamide composition be uniformly incorporated in the polyamide composition by melt kneading prior to molding for obtaining shaped articles, in order to attain the expected improvements of the impact strength and other physical properties of the inorganic-reinforced polyamide composition. The means for melt kneading is not critical if the uniform dispersion of the inorganic material in the polyamide composition can be attained. Usually, the inorganic material-reinforced composition of the present invention may advantageously be prepared by first obtaining a uniform composition of a polyamide, an ionomer resin and an elastomeric copolymer in the above-mentioned manner and then melt kneading the composition with an inorganic material as a filler.

Additives such as dyes, pigments, heat stabilizers, antioxidants, ultraviolet light absorbers, plasticizers and the like may be added to the polyamide compositions and the inorganic material-containing compositions of the present invention in such an amount as will not adversely affect the physical properties of the compositions.

The polyamide compositions of the present invention are featured by their excellent impact strengths at not only ordinary temperatures but also low temperatures as compared with the polyamide per se and conventional polyamide compositions. Therefore, the use of the polyamide compositions of the present invention renders it unnecessary to conduct the burdensome conventional wetting treatment of shaped articles. Further, the processability, inclusive of moldability, of the polyamide compositions of the present invention is very excellent. Especially, the inorganic material-reinforced polyamide compositions of the present invention exhibit excellent impact strengths, mechanical strengths and dimensional stabilities, and also remarkable improvements in warpage due to anisotropy in shrinkage.

The polyamide compositions and reinforced polyamide compositions of the present invention featured by the above advantages are widely used advantageously to fabricate, for example, automobile parts, mechanical parts, engineering parts, electrical parts, sporting and leisure goods, and the like.

The present invention will now be described in more detail with reference to the following Examples that by no means limit the scope of the invention.

The physical properties of the polymer and polymer compositions mentioned in Examples were measured in accordance with the following methods.

1. Izod Impact Strength (kg. cm/cm):

Measurement was conducted according to ASTM-D256. Using a notched test specimen (thickness: 12.7 mm, width: 12.7 mm), Izod impact strengths at 0° C. and 23° C. were measured.

2. Tensile Strength at Yield (kg/cm$^2$) and Tensile Strength at Break (kg/cm$^2$):

Measurement was conducted according to ASTM-D638. Using a dumbbell tensile impact test specimen (thickness: 3.2 mm, width of the flat portion: 12.7 mm), tensile strength at yield and tensile strength at break were measured at 23° C.

3. Modulus of Elasticity in Bending (kg/cm$^2$):

Measurement was conducted according to ASTM-D790. Using a rectangular-shaped specimen (thickness:

6.4 mm, width: 12.7 mm), modulus of elasticity in bending was measured at 23° C.

4. Melt Index (g/10 min):

Measurement was conducted according to ASTM-D1238. Melt index of each polyamide composition prepared using nylon-6 was measured at 235° C. with a load of 1000 g, and the melt index of each polyamide composition prepared using nylon-6,6 was measured at 275° C. with a load of 2160 g.

The content of ethylene monomer units (mole %) in the ethylene ionomer resin (in Referential Examples, referred to simply as "the ethylene content of the ethylene ionomer resin") as well as the contents of other componnets of the ionomer resin as mentioned in Referential Examples were measured as follows:

A specific amount of an ethylene ionomer resin was pressmolded at 180° C. into a sample film of about 45μ in thickness. An infrared absorption spectrum of the resulting sample film was obtained by means of an infrared spectrophotometer (manufactured and sold by Nippon Bunko, K.K. Japan). From the thus obtained infrared absorption spectrum, the absorbance at each of the absorption peaks ascribed to ethylenically unsaturated carboxylic acid ester monomer units (wave number: 1735 cm$^{-1}$), ethylenically unsaturated carboxylic acid monomer units (wave number: 1960 cm$^{-1}$) and ethylenically unsaturated carboxylic acid metal salt monomer units (wave number: variable according to the kind of metal, for example, 1540 cm$^{-1}$ in case the metal is Na) was measured. Each absorbance obtained is converted into the absorbance per one micron of the sample film. Then, on the calibration curve separately prepared, the content of each of the ethylenically unsaturated carboxylic acid ester monomer units, ethylenically unsaturated carboxylic acid monomer units and ethylenically unsaturated carboxylic acid metal salt monomer units was read as a value corresponding to the thus obtained absorbance. The content of ethylene monomer units is 100% minus the sum of the above-determined content values.

The number average molecular weight ($\overline{Mn}$) of the polyamide mentioned in Examples was measured in accordance with the end-group determination method generally employed. That is, a polyamide was dissolved in a solvent therefor, and the concentrations of the end groups of the polyamide, i.e., carboxylic groups and amino groups, were separately determined by titrating the polyamide solution with their respective specific tirant solutions, using indicators. The number average molecular weight of the polyamide was calculated from the thus obtained concentrations of end groups.

The relative viscosity ($\eta$rel) of each polyamide mentioned in the Examples was measured in accordance with JIS K 6810. As a solvent, aqueous sulphuric acid was employed for nylon-6, and formic acid was employed for nylon-6,6.

REFERENTIAL EXAMPLE 1

(Preparation of Ethylene Ionomer Resins)

The ethylene ionomer resins were prepared in substantially the same manner as described in U.S. Pat. No. 4,105,709. That is, (1) Ethylene and methyl methacrylate were copolymerized under conventional reaction conditions for preparing ethylene copolymers using a device for preparing a high-pressure polyethylene to give:

(i) ethylene-methyl methacrylate copolymer (hereinafter abbreviated as "EMMA") containing 95.5% by mole of ethylene and 4.5% by mole of methyl methacrylate and having a melt index of 155 g/10 min, (ii) EMMA containing 94.9% by mole of ethylene and 5.1% by mole of methyl methacrylate and having a melt index of 90 g/10 min, (iii) EMMA containing 94.2% by mole of ethylene and 5.8% by mole of methyl methacrylate and having a melt index of 45 g/10 min, and (iv) EMMA containing 93.3% by mole of ethylene and 6.7% by mole of methyl methacrylate and having a melt index of 140 g/10 min.

(Note: Melt index of each of the above-obtained ethylene ionomer resins was measured according to ASTM D-1238 using 2160 g of load at 190° C.)

(2) Each of the resulting EMMA was charged in a reactor together with hexane, methanol and sodium hydroxide and saponification was carried out at 120° C. for 2 hours. After the reaction, slurries each containing the saponified product were obtained by cooling. The conversion of methyl methacrylate, or the degree of remaining methyl methacrylate ($\alpha/(\alpha+\beta+\gamma) \times 100$), was easily controlled by the amount of sodium hydroxide to be added.

(3) Each saponified product as mentioned above was separated by filtration and dispersed in water, to which an aqueous solution of sulphuric acid was added and the demetalizing reaction was carried out to adjust the proportion of the methacrylic acid and that of the sodium salt of methacrylic acid ($\beta/(\alpha+\beta+\alpha) \times 100$) to the desired values. This adjustment of the proportion of the methacrylic acid and that of the sodium salt of methacrylic acid ($\alpha/(\alpha+\beta+\gamma) \times 100$) was easily effected by controlling the amount of an aqueous solution of sulphuric acid to be added.

(4) Each of the products obtained in the above step (3) was dispersed in water and an aqueous solution of magnesium sulfate or an aqueous solution of zinc acetate was added thereto to change the metal ion from Na to Mg or Zn.

The thus obtained etylene ionomer resins are set forth in Table 1, and numbered as A-1, A-2, A-3 . . . A-7, respectively. In Table 1, ethylene ionomer resins Nos. A-6 and A-7 have their respective melt index values falling outside the scope defined in the present invention.

TABLE 1

| Ethylene ionomer resin No. | Ethylene content, mole % | $\dfrac{\alpha}{\alpha+\beta+\gamma}$ | $\dfrac{\gamma}{\alpha+\beta+\gamma}$ | Melt index, g/10 min | Metal |
|---|---|---|---|---|---|
| A-1 | 95.5 | 0.02 | 0.41 | 1.7 | Mg |
| -2  | 94.9 | 0.18 | 0.43 | 0.3 | " |
| -3  | 94.9 | 0.46 | 0.30 | 1.7 | Zn |
| -4  | 94.2 | 0.47 | 0.22 | 1.3 | Mg |
| -5  | 93.3 | 0.45 | 0.31 | 0.4 | " |
| -6  | 94.9 | 0.28 | 0.26 | 3.3 | " |
| -7  | 94.9 | 0.46 | 0.21 | 4.1 | " |

REFERENTIAL EXAMPLE 2

Elastomeric ethylene copolymers used in the following Examples and Comparative Examples are listed hereinbelow. They are all commercially available.

As copolymers of ethylene and an alpha-olefin having 3 to 8 carbon atoms of which the melt index values fall within the scope as defined in the present invention, there were employed:

(i) ethylene-propylene copolymer (hereinafter abbreviated as "EPR") containing about 5% by mole of propylene and having a melt index of 1.1 g/10 min (B-1), (ii) EPR containing about 19% by mole of propylene and having a melt index of 2.2 g/10 min (B-2), (iii) EPR containing about 20% by mole of propylene and having a melt index of 2.9 g/10 min (B-3), and (iv) EPR containing about 23% by mole of propylene and having a melt index of 4.8 g/10 min (B-4).

As a copolymer of ethylene and an alpha-olefin having 3 to 8 carbon atoms of which the melt index value falls outside the scope as defined in the present invention, there was employed EPR containing about 21% by mole of propylene and having a melt index of 0.12 g/10 min (B-5).

As a copolymer of ethylene and butene-1 of which the melt index value falls within the scope as defined in the present invention, there was employed an ethylene-butene-1 copolymer containing about 14% by mole of butene-1 and having a melt index of 4.0 g/10 min (B-6).

As a copolymer of ethylene and a butene-1 of which the melt index value falls outside the scope as defined in the present invention, there was employed an ethylene-butene-1 copolymer containing about 12% by mole of butene-1 and having a melt index of 20 g/10 min (B-7).

The thus obtained elastomeric ethylene copolymers are set forth in Table 2.

TABLE 2

| Run No. | Elastomeric ethylene copolymer | Ethylene content, mole % | Comonomer content, mole % | Melt index, g/10 min |
|---|---|---|---|---|
| B-1 | EPR | 86 | 15 | 1.1 |
| B-2 | " | 81 | 19 | 2.2 |
| B-3 | " | 80 | 20 | 2.9 |
| B-4 | " | 77 | 23 | 4.8 |
| B-5 | " | 79 | 21 | 0.1 |
| B-6 | Ethylene-butene-1 copolymer | 86 | 14 | 4.0 |
| B-7 | Ethylene-butene-1 copolymer | 88 | 12 | 20 |

TABLE 2-continued

| Run No. | Elastomeric ethylene copolymer | Ethylene content, mole % | Comonomer content, mole % | Melt index, g/10 min |
|---|---|---|---|---|

EXAMPLES 1 TO 21 AND COMPARATIVE EXAMPLES 1 TO 17

Using a twin screw extruder (30 mmϕ, L/D=34), nylon-6 (C-1) ($\eta$rel=3.0, $\overline{M}n$=about 18,000), nylon-6 (C-2) ($\eta$rel=2.7, $\overline{M}n$=about 16,000) and nylon-6,6 (C-3) ($\eta$rel=2.9, $\overline{M}n$=about 18,000) were melt-kneaded with ethylene ionomer resins as prepared in Referential Example 1 and elastomeric ethylene copolymers as mentioned in Referential Example 2 in mixing ratios as indicated in Table 3 to obtain polyamide compositions D-1, D-2, . . . D-21. The amount of each polyamide employed herein was 5.0 kg. With respect to the polyamide compositions Nos. D-2, D-9 and D-18, they were prepared by simultaneously melt kneading a polyamide, an ethylene ionomer resin and an elastomeric copolymer. With respect to the other polyamide compositions than those mentioned above, they were prepared by first melt kneading an ethylene ionomer resin and an elastomeric ethylene copolymer to form a preliminary composition, second pelletizing the preliminary composition and third melt kneading the resulting pelletized preliminary composition with a polyamide. Melt kneading temperature was 240° C. for nylon-6, and 280° C. for nylon-6,6.

In substantially the same manner as described in Examples 1 to 21, comparative polyamide compositions A to Q were prepared.

The thus obtained polyamide compositions are set forth in Table 3. With respect to the mixing ratio, A, B and C indicate the weights of an ethylene ionomer resin, an elastomeric ethylene copolymer and a polyamide, respectively.

TABLE 3

| Example No. | Polyamide composition No. | Polyamide No. | Ethylene ionomer resin No. | Elastomeric ethylene copolymer No. | Mixing ratio C/(A + B) | Mixing ratio A/B |
|---|---|---|---|---|---|---|
| Example 1 | D-1 | C-1 | A-2 | B-1 | 70/30 | 80/20 |
| Example 2 | D-2 | " | " | " | " | 70/30 |
| Example 3 | D-3 | " | " | B-4 | " | " |
| Example 4 | D-4 | " | " | " | " | 50/50 |
| Example 5 | D-5 | " | " | " | " | 30/70 |
| Comparative Example 1 | A | " | — | — | 100/0 | — |
| Comparative Example 2 | B | " | A-2 | — | 70/30 | 100/0 |
| Comparative Example 3 | C | " | " | B-5 | " | 80/20 |
| Example 6 | D-6 | C-2 | A-1 | B-4 | " | 70/30 |
| Example 7 | D-7 | " | A-2 | B-1 | " | " |
| Example 8 | D-8 | " | " | B-2 | " | 80/20 |
| Example 9 | D-9 | " | " | " | " | 70/30 |
| Example 10 | D-10 | " | " | B-3 | " | " |
| Example 11 | D-11 | " | " | B-4 | 75/25 | " |
| Example 12 | D-12 | " | " | " | 70/30 | " |
| Example 13 | D-13 | " | " | B-6 | " | " |
| Example 14 | D-14 | " | " | mixture of B-4 and B-7 | " | " |
| Example 15 | D-15 | " | A-3 | B-4 | " | " |
| Example 16 | D-16 | " | A-4 | " | " | " |
| Comparative Example 4 | D | C-2 | — | — | 100/0 | — |
| Comparative Example 5 | E | " | A-2 | — | 75/25 | 100/0 |
| Comparative Example 6 | F | " | " | — | 70/30 | " |

TABLE 3-continued

| Example No. | Polyamide composition No. | Polyamide No. | Ethylene ionomer resin No. | Elastomeric ethylene copolymer No. | Mixing ratio C/(A + B) | Mixing ratio A/B |
|---|---|---|---|---|---|---|
| Comparative Example 7 | G | " | " | B-5 | " | 80/20 |
| Comparative Example 8 | H | " | A-1 | — | " | 100/0 |
| Comparative Example 9 | I | " | A-4 | — | " | " |
| Comparative Example 10 | J | " | A-3 | — | " | " |
| Comparative Example 11 | K | " | A-6 | B-4 | " | 75/25 |
| Comparative Example 12 | L | " | A-7 | " | " | " |
| Example 17 | D-17 | C-3 | A-2 | B-3 | " | 70/30 |
| Example 18 | D-18 | " | " | B-4 | 75/30 | " |
| Example 19 | D-19 | " | " | " | 70/30 | " |
| Example 20 | D-20 | " | A-4 | " | " | " |
| Example 21 | D-21 | " | A-5 | " | " | " |
| Comparative Example 13 | M | " | — | — | 100/0 | — |
| Comparative Example 14 | N | " | A-2 | — | 75/25 | 100/0 |
| Comparative Example 15 | O | " | " | — | 70/30 | " |
| Comparative Example 16 | P | " | A-4 | — | " | " |
| Comparative Example 17 | Q | " | A-5 | — | " | " |

Some of each of the thus prepared polyamide compositions was molded into a test specimen for measuring physical properties by means of an injection-molding machine. Molding temperature was 240° C. for the polyamide compositions prepared using nylon-6, and 280° C. for the polyamide compositions prepared using nylon-6,6. The test specimens were allowed to stand in a desiccator containing silica gel placed in a room kept at a constant temperature (23° C.) for 24 hours. The test specimens were measured with respect to the physical properties, i.e. melt index, izod impact strength, tensile strength at yield and modulus of elasticity in bending.

The results obtained are as shown in Table 4 and FIGURE of the accompanying drawing. FIGURE shows the Izod Impact strengths of polyamide compositions mentioned in Example 1 [D-7, D-9, D-10, D-12, F (Comparative), G (Comparative): see Table 3 and Table 4] at varied temperatures ranging from low to ordinary, i.e. −30° C. to 23° C.

As is clear from Table 4, the polyamide compositions according to the present invention, as compared with comparative polyamide compositions, have remarkably high impact strengths and improved fluidity in a molten state which ensures improved moldability. Also, as is clear from FIGURE, the polyamide compositions according to the present invention have remarkably high impact strengths even at low temperatures.

TABLE 4

| Example No. | Polyamide composition No. | Melt index, g/10 min | Izod impact strength, kg · cm/cm 23° C. | 0° C. | Tensile strength at yield, kg/cm² | Modulus of elastisity in bending, kg/cm² |
|---|---|---|---|---|---|---|
| Example 1 | D-1 | 2.0 | 111 | 100 | 520 | 15900 |
| Example 2 | D-2 | 2.2 | 105 | 102 | " | 15800 |
| Example 3 | D-3 | 2.4 | 106 | " | " | " |
| Example 4 | D-4 | 3.9 | 101 | 94 | 510 | 15400 |
| Example 5 | D-5 | 4.4 | 91 | 84 | " | 15100 |
| Comparative Example 1 | A | 18 | 5 | 3 | 740 | 26400 |
| Comparative Example 2 | B | 1.6 | 83 | 26 | 530 | 16400 |
| Comparative Example 3 | C | 1.2 | 92 | 31 | 520 | 15800 |
| Example 6 | D-6 | 1.8 | 81 | 63 | 500 | 15400 |
| Example 7 | D-7 | 4.5 | 103 | 85 | " | " |
| Example 8 | D-8 | 4.7 | " | 91 | 510 | 15600 |
| Example 9 | D-9 | 4.7 | 102 | 90 | " | 15400 |
| Example 10 | D-10 | 4.9 | 104 | 92 | 500 | " |
| Example 11 | D-11 | 6.0 | 89 | 69 | 650 | 16400 |
| Example 12 | D-12 | 5.1 | 102 | 97 | 510 | 15600 |
| Example 13 | D-13 | 4.9 | 93 | 80 | " | 15800 |
| Example 14 | D-14 | 6.5 | 99 | 85 | 500 | " |
| Example 15 | D-15 | 3.8 | 91 | 64 | 490 | 15100 |
| Example 16 | D-16 | 4.2 | 87 | 60 | " | 15400 |
| Comparative Example 4 | D | 19 | 5 | 3 | 730 | 26000 |
| Comparative Example 5 | E | 5.3 | 30 | 21 | 660 | 17100 |

TABLE 4-continued

| Example No. | Polyamide composition No. | Melt index, g/10 min | Izod impact strength, kg · cm/cm 23° C. | Izod impact strength, kg · cm/cm 0° C. | Tensile strength at yield, kg/cm² | Modulus of elastisity in bending, kg/cm² |
|---|---|---|---|---|---|---|
| Comparative Example 6 | F | 4.3 | 81 | 28 | 520 | 16000 |
| Comparative Example 7 | G | 3.9 | 92 | 30 | 510 | 15400 |
| Comparative Example 8 | H | 1.2 | 26 | 13 | 520 | 16100 |
| Comparative Example 9 | I | 3.1 | 37 | 16 | 510 | 15600 |
| Comparative Example 10 | J | 3.6 | 34 | 15 | " | " |
| Comparative Example 11 | K | 2.4 | 43 | 24 | 490 | 15100 |
| Comparative Example 12 | L | 4.2 | 58 | 27 | 480 | " |
| Example 17 | D-17 | 8.5 | 79 | 42 | 590 | 16400 |
| Example 18 | D-18 | 13 | " | 36 | 660 | 17800 |
| Example 19 | D-19 | 8.7 | 81 | 50 | 590 | 16400 |
| Example 20 | D-20 | 3.4 | 99 | 78 | 580 | 15800 |
| Example 21 | D-21 | 8.1 | 90 | 73 | " | 15600 |
| Comparative Example 13 | M | 33 | 4 | 2 | 760 | 30600 |
| Comparative Example 14 | N | 11 | 26 | 18 | 690 | 19200 |
| Comparative Example 15 | O | 8.0 | 60 | 24 | 670 | 17900 |
| Comparative Example 16 | P | 2.7 | 92 | 26 | 640 | 16400 |
| Comparative Example 17 | Q | 7.5 | 74 | 24 | 650 | " |

EXAMPLES 22 TO 26 AND COMPARATIVE EXAMPLES 18 TO 22

Using a single screw extruder, 5.0 kg of each of polyamide compositions prepared in Examples 1 to 21 was melt-kneaded with glass fiber (manufactured by Asahi Fiber Glass Co., Ltd., CS-03-MA-411) in a mixing ratio as indicated in Table 5 to obtain glass-fiber reinforced polyamide composition E-1 to E-5. Melt kneading temperature was 240° C. for the polyamide compositions prepared using nylon-6, and 280° C. for the polyamide compositions prepared using nylon-6,6.

In substantially the same manner as described in Examples 22 to 26, comparative glass-fiber reinforced polyamide compositions R to V were prepared.

The thus obtained glass-fiber reinforced polyamide compositions were molded into test specimens in substantially the same manner as described in Examples 1 to 21 and Comparative Examples 1 to 17, and measured with respect to physical properties thereof.

The results obtained are as set forth in Table 5. With respect to the mixing ratio, D indicates the weight of a polyamide or a polyamide composition, and GF indicates the weight of a glass fiber.

As is clear from Table 5, the glass fiber-reinforced polyamide compositions according to the present invention are remarkably improved in fluidity in a molten state and impact strength.

TABLE 5

| Example No. | Glass fiber-reinforced polyamide composition No. | Polyamide composition No. (see Table 3) | Mixing ratio D/GF | Izod impact strength, kg · cm/cm 23° C. | Izod impact strength, kg · cm/cm 0° C. | Tensile strength at break, kg/cm² | Modulus of elastisity in bending, kg/cm² |
|---|---|---|---|---|---|---|---|
| Example 22 | E-1 | D-3 | 100/20 | 29 | 24 | 910 | 36800 |
| Comparative Example 18 | R | A | " | 8 | 5 | 1200 | 49000 |
| Comparative Example 19 | S | B | " | 16 | 13 | 920 | 37200 |
| Example 23 | E-2 | D-11 | " | 21 | 15 | 970 | 37700 |
| Example 24 | E-3 | D-12 | " | 28 | 22 | 900 | 35500 |
| Comparative Example 20 | T | E | " | 13 | 9 | 980 | 38000 |
| Example 25 | E-4 | D-19 | " | 25 | 21 | 950 | 37100 |
| Example 26 | E-5 | D-20 | " | 28 | 23 | 940 | 35700 |
| Comparative Example 21 | U | O | " | 14 | 19 | 960 | 39000 |
| Comparative Example 22 | V | P | " | 17 | 14 | 960 | 38200 |

What is claimed is:
1. A high impact polyamide composition comprising a polyamide(A), an ethylene ionomer resin(B) and an elastomeric ethylene copolymer(C);
the weight proportion of the polyamide(A) relative to the total of (A), (B) and (C) being 60 to 90%, the weight proportion of the ethylene ionomer resin(B) relative to the total of (A), (B) and (C) being 1 to

45%, and the weight proportion of the elastomeric ethylene copolymer(C) relative to the total of (A), (B) and (C) being 0.5 to 40%;

and wherein the ethylene ionomer resin(B) and the elastomeric ethylene copolymer(C) respectively have melt indexes ($F_b$) and ($F_c$) satisfying the inequalities;

$$3 \geq F_b \geq 0.2$$

$$10 \geq F_c \geq 1$$

$$50 \geq F_c/F_b \geq 2$$

said melt indexes $F_b$ and $F_c$ each being given in terms of a value (g/10 min) as measured at a cylinder temperature of 190° C. with a load of 2160 g in accordance with ASTM-D 1238.

2. A high impact polyamide composition according to claim 1, wherein the ethylene ionomer resin(B) comprises ethylene monomer units, ethylenically unsaturated carboxylic acid ester monomer units, ethylenically unsaturated carboxylic acid monomer units and ethylenically unsaturated carboxylic acid metal salt monomer units;

the molar proportion of said ethylene monomer units relative to the total of the ethylene monomer units, ethylenically unsaturated carboxylic acid ester monomer units, ethylenically unsaturated carboxylic acid monomer units and ethylenically unsaturated carboxylic acid metal salt monomer units being 90 to 97%;

and wherein the number of moles of ethylenically unsaturated carboxylic acid ester monomer units ($\alpha$), the number of moles of ethylenically unsaturated carboxylic acid monomer units ($\beta$) and the number of moles of ethylenically unsaturated carboxylic acid metal salt monomer units ($\gamma$) satisfy the inequalities:

$$0 \leq \frac{\alpha}{\alpha + \beta + \gamma} \leq 0.6$$

$$0.1 \leq \frac{\gamma}{\alpha + \beta + \gamma} \leq 0.7$$

3. A high impact polyamide composition according to claim 1, wherein the polyamide(A) has a number average molecular weight of about 5,000 to about 50,000.

4. A high impact polyamide composition according to claim 1, wherein the elastomeric ethylene copolymer(C) is a copolymer of ethylene and an alpha-olefin containing 3 to 8 carbon atoms.

5. A high impact polyamide composition according to claim 1, wherein the elastomeric ethylene copolymer(C) is a polymer of ethylene, an alpha-olefin containing 3 to 8 carbon atoms and a diene monomer.

6. A high impact polyamide composition according to claim 4, wherein said alpha-olefin is propylene or butene-1.

7. A high impact polyamide composition comprising 60 to 95 parts by weight of the polyamide composition according to claim 1 and 5 to 40 parts by weight of an inorganic material, the total weight of the polyamide composition and the inorganic material being 100 parts by weight.

8. A high impact polyamide composition according to claim 7, wherein
the molar proportion of the ethylene monomer units relative to the total of the ethylene monomer units, ethylenically unsaturated carboxylic acid ester monomer units, ethylenically unsaturated carboxylic acid monomer units and ethylenically unsaturated carboxylic acid metal salt monomer units is 90 to 97%;

and wherein the number of moles of ethylenically unsaturated carboxylic acid ester monomer units ($\alpha$), the number of moles of ethylenically unsaturated carboxylic acid monomer units ($\beta$) and the number of moles of ethylenically unsaturated carboxylic acid metal salt monomer units ($\gamma$) satisfy the inequalities:

$$0 \leq \frac{\alpha}{\alpha + \beta + \gamma} \leq 0.6$$

$$0.1 \leq \frac{\gamma}{\alpha + \beta + \gamma} \leq 0.7.$$

9. A high impact polyamide composition according to claim 7, wherein said inorganic material is a member selected from the group consisting of glass fiber, asbestos, bentonite, diatomaceous earth, mica, talc, calcium carbonate, calcium sulfate, calcium sulfite and mixtures thereof.

10. A high impact polyamide composition according to claim 5, wherein said $\alpha$-olefin is propylene or butene-1.

* * * * *